US012514409B2

(12) United States Patent
Matsko et al.

(10) Patent No.: US 12,514,409 B2
(45) Date of Patent: Jan. 6, 2026

(54) SEQUENTIALLY ACTIVATED MULTI-DIAPHRAGM FOAM AT-A-DISTANCE DISPENSER SYSTEMS

(71) Applicant: GOJO Industries, Inc., Akron, OH (US)

(72) Inventors: Steven S. Matsko, Hartville, OH (US); Nick E. Ciavarella, Seven Hills, OH (US); Jeffrey S. Louis, Akron, OH (US); John J. McNulty, Broadview Heights, OH (US)

(73) Assignee: GOJO Industries, Inc., Akron, OH (US)

( * ) Notice: Subject to any disclaimer, the term of this patent is extended or adjusted under 35 U.S.C. 154(b) by 241 days.

(21) Appl. No.: 18/159,697

(22) Filed: Jan. 26, 2023

(65) Prior Publication Data

US 2023/0240482 A1 Aug. 3, 2023

Related U.S. Application Data

(60) Provisional application No. 63/306,169, filed on Feb. 3, 2022.

(51) Int. Cl.
*A47K 5/16* (2006.01)
*B05B 7/00* (2006.01)
*B05B 7/04* (2006.01)

(52) U.S. Cl.
CPC .............. *A47K 5/16* (2013.01); *B05B 7/0062* (2013.01); *B05B 7/0425* (2013.01); *B05B 7/045* (2013.01)

(58) Field of Classification Search
CPC ...... A47K 5/16; B05B 7/0062; B05B 7/0425; B05B 7/045; B05B 12/1445; B05B 7/0025; B05B 7/2491; F04B 13/02; F04B 43/026
See application file for complete search history.

(56) References Cited

U.S. PATENT DOCUMENTS

| | | | |
|---|---|---|---|
| 5,540,362 | A | 7/1996 | Azuma et al. |
| 6,871,679 | B2 | 3/2005 | Last |
| 7,364,053 | B2 | 4/2008 | Ophardt |

(Continued)

OTHER PUBLICATIONS

International Search Report and Written Opinion from PCT/US23/61320 dated May 10, 2023.

*Primary Examiner* — Bob Zadeh
(74) *Attorney, Agent, or Firm* — Calfee, Halter & Griswold LLP

(57) ABSTRACT

An exemplary foam dispenser includes a housing, a reservoir for holding a foamable liquid, and a pump located below the reservoir. The pump includes a liquid pump chamber, two or more air pump chamber and a manifold. The manifold includes a liquid outlet port, a liquid outlet valve and an air outlet port. An elongated liquid dispensing conduit in fluid communication with the liquid outlet port and an elongated air dispensing conduit in fluid communication with the air outlet port are also included. A mixing chamber having a mixing chamber liquid inlet, a mixing chamber air inlet, and a foam outlet is provided. The mixing chamber is located remotely from the sequentially operated multi-diaphragm pump. The elongated liquid dispensing conduit is in fluid communication with the mixing chamber liquid inlet and the elongated air dispensing conduit is in fluid communication with the mixing chamber air inlet.

20 Claims, 8 Drawing Sheets

(56) References Cited

U.S. PATENT DOCUMENTS

| | | | | |
|---|---|---|---|---|
| 7,455,197 | B2 | 11/2008 | Ophardt | |
| 7,647,954 | B2 | 1/2010 | Garber et al. | |
| 8,960,498 | B2 | 2/2015 | Wegelin et al. | |
| 9,596,963 | B2 | 3/2017 | Harris et al. | |
| 10,143,339 | B2 | 12/2018 | Ciavarella et al. | |
| 2012/0285992 | A1 * | 11/2012 | Ciavarella | B05B 9/0416 222/138 |
| 2014/0054322 | A1 | 2/2014 | McNulty et al. | |
| 2014/0234140 | A1 | 8/2014 | Curtis et al. | |
| 2015/0025184 | A1 | 1/2015 | Du et al. | |
| 2015/0266657 | A1 | 9/2015 | Corney | |
| 2016/0213203 | A1 * | 7/2016 | Pelfrey | B05B 7/2464 |
| 2017/0135531 | A1 * | 5/2017 | Mak | A47K 5/14 |
| 2017/0231437 | A1 * | 8/2017 | Ciavarella | F04B 23/02 222/190 |
| 2019/0133384 | A1 | 5/2019 | McNulty et al. | |
| 2019/0274487 | A1 * | 9/2019 | McNulty | A47K 5/16 |
| 2019/0307297 | A1 | 10/2019 | Ciavarella | |
| 2020/0000291 | A1 | 1/2020 | Krishnan et al. | |
| 2020/0197966 | A1 | 6/2020 | Marshall et al. | |
| 2021/0059481 | A1 * | 3/2021 | Bai | A47K 5/16 |
| 2021/0059482 | A1 | 3/2021 | Bai | |
| 2023/0240482 | A1 * | 8/2023 | Matsko | F04B 43/026 222/19 |

* cited by examiner

SEQUENTIALLY ACTIVATED MULTI-DIAPHRAGM FOAM AT-A-DISTANCE DISPENSER SYSTEMS

CROSS-REFERENCE TO RELATED APPLICATION(S)

This application claims priority to and the benefit of U.S. Provisional Patent Application No. 63/306,169, filed Feb. 3, 2022, the entire disclosure of which is incorporated herein by reference in full.

TECHNICAL FIELD

The present invention relates generally to pumps and dispenser systems, and more particularly to foam at a distance dispensing systems having a single sequentially activated multi-diaphragm pump for mixing liquid (e.g. soap or sanitizer) with air at a location away from the pump to create and dispense a foam-at-a-distance product.

BACKGROUND OF THE INVENTION

Liquid dispenser systems, such as liquid soap and sanitizer dispensers, provide a user with a predetermined amount of liquid upon actuation of the dispenser. In addition, it is sometimes desirable to dispense the liquid in the form of foam by, for example, injecting air into the liquid to create a foamy mixture of liquid and air bubbles. Typically, the liquid and air are mixed together near the pump and the foam product is pushed through a dispensing tube and dispensed at a location away from the foam pump. There have been attempts to mix liquid and air at a location away from the pump, however, the consistency of the foam output in those systems is often poor. It is believed that the inconsistency in these prior art systems is at least partially due to inconsistent mixture ratios created by the air flow through the air dispensing tube and the liquid through the liquid dispensing tube. Many variables affect the flow through the tubes. In addition, the pressure required for initial movement of fluid through the dispensing tubes is different than the pressure require to maintain fluid flow through the dispensing tube and accordingly, the fluid flow rate into the mixing chamber is inconsistent.

SUMMARY

The present application discloses exemplary foam dispensing systems and foam dispensers. An exemplary foam dispenser includes a housing, a reservoir for holding a foamable liquid, and a sequentially operated multi-diaphragm pump located below the reservoir. The sequentially operated multi-diaphragm pump has a liquid pump chamber, two or more air pump chambers, and a manifold. The manifold has a first one-way liquid outlet valve secured thereto, a liquid outlet port, an air outlet port, a one-way air outlet valve and a liquid pump chamber sealing portion configured to prevent liquid from flowing through the one-way air outlet valve. an elongated liquid dispensing conduit in fluid communication with the liquid outlet port. An elongated air dispensing conduit is in fluid communication with the air outlet port. A mixing chamber located remotely from the sequentially operated multi-diaphragm pump. The mixing chamber has a mixing chamber liquid inlet, a mixing chamber air inlet, and a foam outlet. The elongated liquid dispensing conduit is in fluid communication with the mixing chamber liquid inlet. The elongated air dispensing conduit is in fluid communication with the mixing chamber air inlet. During operation, the mixing chamber receives fluid as a series of single injections of liquid followed by two or more single injections of air. An outlet nozzle is located downstream of the foam outlet of the mixing chamber and the outlet nozzle is located above at least a portion of the reservoir.

Another exemplary foam dispenser includes a housing, a reservoir for holding a foamable liquid and a sequentially operated multi-diaphragm pump. The sequentially operated multi-diaphragm pump has a liquid pump chamber, two or more air pump chambers, and a manifold. The manifold has a liquid outlet port, a liquid outlet valve, a liquid inlet port, a liquid inlet valve, an air outlet port, and one or more air outlet valves. An elongated liquid dispensing conduit is in fluid communication with the liquid outlet port. An elongated air dispensing conduit is in fluid communication with the air outlet port. A mixing chamber is located remotely from the sequentially operated multi-diaphragm pump. The mixing chamber has a mixing chamber liquid inlet, a mixing chamber air inlet, and a foam outlet. The elongated liquid dispensing conduit is in fluid communication with the mixing chamber liquid inlet. The elongated air dispensing conduit is in fluid communication with the mixing chamber air inlet, and an outlet nozzle located downstream of the foam outlet of the mixing chamber. The outlet nozzle is located above at least a portion of the reservoir.

Another exemplary foam dispenser includes a housing, a reservoir for holding a foamable liquid and a sequentially operated multi-diaphragm pump. The sequentially operated multi-diaphragm pump has a liquid pump chamber, two or more air pump chamber, and a manifold. The manifold has a liquid outlet port, a liquid outlet valve, an air outlet port, one or more air inlet valves, a liquid inlet port and a liquid inlet port valve. The liquid inlet port and the liquid outlet port are parallel to one another. An elongated liquid dispensing conduit is in fluid communication with the liquid outlet port. An elongated air dispensing conduit in fluid communication with the air outlet port. A mixing chamber is located remotely from the sequentially operated multi-diaphragm pump. The mixing chamber has a mixing chamber liquid inlet, a mixing chamber air inlet, and a foam outlet. The elongated liquid dispensing conduit is in fluid communication with the mixing chamber liquid inlet. The elongated air dispensing conduit is in fluid communication with the mixing chamber air inlet. An outlet nozzle is located downstream of the foam outlet of the mixing chamber. At least a portion of the outlet nozzle is located above at least a portion of the reservoir, and the mixing chamber receives a series of at least 10 pulses of fluid, wherein each series is in the form of a sequence of a liquid pulse followed by two or more air pulses.

An exemplary foam dispenser includes a housing, a reservoir for holding a foamable liquid, and a sequentially operated multi-diaphragm pump located below the reservoir. The sequentially operated multi-diaphragm pump includes a liquid pump chamber, two or more air pump chamber and a manifold. The manifold includes a liquid outlet port, a liquid outlet valve and an air outlet port. An elongated liquid dispensing conduit in fluid communication with the liquid outlet port and an elongated air dispensing conduit in fluid communication with the air outlet port are also included. A mixing chamber having a mixing chamber liquid inlet, a mixing chamber air inlet, and a foam outlet is provided. The mixing chamber is located remotely from the sequentially operated multi-diaphragm pump. The elongated liquid dispensing conduit is in fluid communication with the mixing chamber liquid inlet and the elongated air dispensing conduit is in fluid communication with the mixing chamber air inlet. An outlet nozzle located downstream of the foam outlet of the mixing chamber and the outlet nozzle is located above at least a portion of the reservoir.

Another exemplary foam dispenser includes a housing, a reservoir for holding a foamable liquid and a sequentially operated multi-diaphragm pump. The sequentially operated multi-diaphragm pump has a liquid pump chamber, two or more air pump chambers and a manifold. The manifold has a liquid outlet port, a liquid outlet valve, a liquid inlet port, a liquid inlet valve, an air outlet port, and one or more air inlet valves. An elongated liquid dispensing conduit is in fluid communication with the liquid outlet port. An elongated air dispensing conduit in fluid communication with the air outlet port. A mixing chamber is located remotely from the sequentially operated multi-diaphragm pump. The mixing chamber includes a mixing chamber liquid inlet, a mixing chamber air inlet, and a foam outlet. The elongated liquid dispensing conduit is in fluid communication with the mixing chamber liquid inlet. The elongated air dispensing conduit is in fluid communication with the mixing chamber air inlet. An outlet nozzle located downstream of the foam outlet of the mixing chamber is also included. The outlet nozzle is located above at least a portion of the reservoir.

Another exemplary foam dispenser includes a housing, a reservoir for holding a foamable liquid, and a sequentially operated multi-diaphragm pump. The sequentially operated multi-diaphragm pump includes a liquid pump chamber, two or more air pump chamber and a manifold. The manifold includes a liquid outlet port, a liquid outlet valve, an air outlet port, and one or more air inlet valves. A liquid inlet port and liquid inlet port valve are also included. An elongated liquid dispensing conduit in fluid communication with the liquid outlet port and a liquid inlet port of a mixing chamber located remotely from the sequentially operated multi-diaphragm pump is also included. An elongated air dispensing conduit in fluid communication with the air outlet port and a mixing chamber air inlet. An outlet nozzle located downstream of the foam outlet of the mixing chamber and above at least a portion of the reservoir is also included.

DETAILED DESCRIPTION

Figure 1:
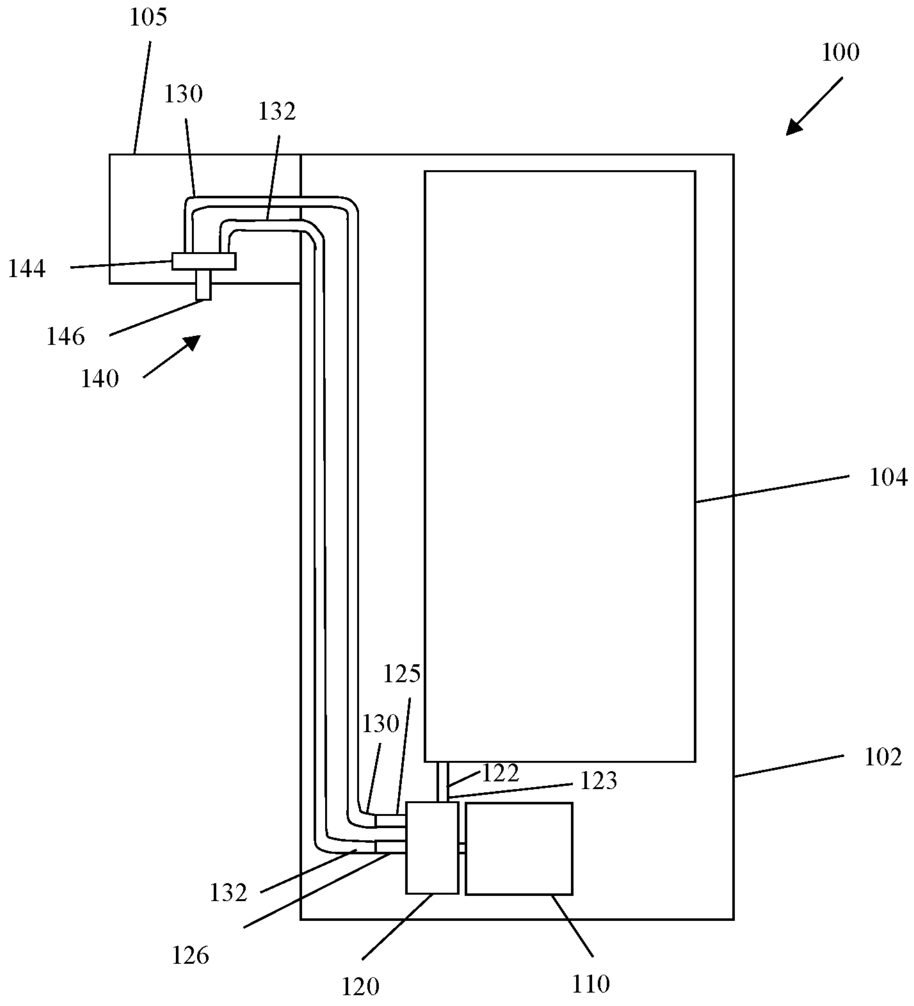
FIG. 1 is an exemplary embodiment foam dispensing system having a sequentially operated multi-diaphragm pump, a mixing chamber and foam output, with the mixing chamber located away from the pump.

The present application discloses exemplary embodiments of foam dispensers and dispensing systems that having sequentially activated multi-diaphragm pumps and that produce foam at a location that is remote from the pump. The present application also discloses exemplary manifolds for such pumps. Some exemplary embodiments include a wobble plate and three or more pump diaphragms. The three or more pump diaphragms include at least one liquid pump diaphragm and at least two air pump diaphragms. Each liquid pump diaphragm has a liquid inlet for receiving liquid, such as, for example, a soap or a sanitizer, and each air pump diaphragm has an air inlet for receiving air. In some exemplary embodiments the liquid inlet is located substantially perpendicular to the one or more liquid pump diaphragms. This arrangement provides various benefits, some of which are described in more detail below. In some embodiments, the liquid inlet is located substantially perpendicular to the liquid outlet. This arrangement provides various benefits, some of which are described in more detail below. In some embodiments, the liquid inlet and liquid outlet are substantially parallel to one another. This arrangement provides various benefits, some of which are described in more detail below.

The three or more pump diaphragms operate sequentially, and each pump diaphragm operates once in an operating cycle. An operating cycle may begin with the operation of a liquid pump diaphragm followed by the operation of at least one first air pump diaphragm and sequentially by at least one additional air pump diaphragm. Multiple operation cycles are required for each dispense of a foam product. The volumes of the liquid pump chamber formed by the liquid pump diaphragm is small. In some embodiments, the small volume of the liquid pump diaphragm is less than about 0.150 milliliters (mL). In some embodiments, the small volume of the liquid pump diaphragm is less than about 0.140 milliliters (mL). In some embodiments, the small volume of the liquid pump diaphragm is less than about 0.130 milliliters (mL). In some embodiments, the small volume of the liquid pump diaphragm is less than about 0.120 milliliters (mL). In some embodiments, the small volume of the liquid pump diaphragm is less than about 0.100 milliliters (mL). In some embodiments, the small volume of the liquid pump diaphragm is less than about 0.090 milliliters (mL). In some embodiments, the small volume of the liquid pump diaphragm is less than about 0.080 milliliters (mL). In some embodiments, the small volume of the liquid pump diaphragm is less than about 0.075 milliliters (mL). In some embodiments, the small volume of the liquid pump diaphragm is less than about 0.070 milliliters (mL). In some embodiments, the small volume of the liquid pump diaphragm is less than about 0.060 milliliters (mL). In some embodiments, the small volume of the liquid pump diaphragm is less than about 0.050 milliliters (mL). Similarly, the volumes of the air pump chambers formed by the air pump diaphragms are small. In some embodiments, there are multiple air pump diaphragms. The following volumes are for each air pump diaphragm. For example, if there are three air pump diaphragms, the total volume is the volume of the air pump diaphragms times the number of air pump diaphragms. For example, if there are 3 air pump diaphragms and each air pump diaphragm has a volume of 0.3 mL, then the total volume of air for one revolution of the pump is 0.9 mL (3×0.3). In some embodiments, the volume of each air pump diaphragm is less than about 1 mL. In some embodiments, the volume of each air pump diaphragm is less than about 0.9 mL. In some embodiments, the volume of each air pump diaphragm is less than about 0.8 mL. In some embodiments, the volume of each air pump diaphragm is less than about 0.7 mL. In some embodiments, the volume of each air pump diaphragm is less than about 0.6 mL. In some embodiments, the volume of each air pump diaphragm is less than about 0.5 mL. In some embodiments, the volume of each air pump diaphragm is less than about 0.4 mL. In some embodiments, the volume of each air pump diaphragm is less than about 0.3 mL. In some embodiments, the volume of each air pump diaphragm is less than about 0.2 mL. In some embodiments, the volume of each air pump diaphragm is less than about 0.1 mL.

The term "small volume of fluid" means a volume of fluid that is less than about 1 mL The term "discrete dose" of fluid means the volume of fluid that is pumped by a single operation of a single pump diaphragm.

The term "remote" or "remotely" located mixing chamber, as used herein, means that the mixing chamber is located at least 3" from the air outlet 126 and liquid outlet 125 of the sequentially activated multi-diaphragm pump 120.

In some embodiments, these small volumes of liquid and air that are pumped each cycle overcome the deficiencies in the prior art by causing a precise amount of fluid to be pumped into the remote mixing chamber over each operating cycle. The small volumes reduce or eliminate surges of liquid being forced into the mixing chamber that occur with the prior art devices. Accordingly, it is believed that multiple operating cycles that pump discrete doses of fluid followed by multiple doses of air into the mixing chamber improve the consistency of the foam output.

Detailed operation of the sequentially operated multi-diaphragm pumps that may be used and modified herein are shown and described in Applicants U.S. Pat. No. 10,143,339, titled Sequentially Activated Multi-Diaphragm Foam Pumps, Refill Units and Dispenser Systems, which is incorporated herein by reference in its entirety.

The single sequentially activated multi-diaphragm pump separately pumps liquid and air through conduits to a remote mixing chamber where the liquid and air are mixed together. Located proximate the remote mixing chamber is an outlet for dispensing foam into a user's hand. In some exemplary embodiments, the remote mixing chamber is located at a point higher than the pump, and the pump separately pumps liquid and air through separated conduits to the remote mixing chamber. In some embodiment, the sequentially activated multi-diaphragm pump is located below a countertop and the mixing chamber is located above the countertop. In some embodiments, the sequentially activated multi-diaphragm pump is located in the base of a dispenser and the remote mixing chamber and outlet nozzle are located near the top of the dispenser. Each liquid pump diaphragm pumps liquid into the remote mixing chamber, and each air pump diaphragm pumps air into the remote mixing chamber. The liquid mixes with the air in the mixing chamber to create a foam mixture that is dispensed out of the pump outlet. In some embodiments of the present invention, the foam mixture has an air to liquid ratio of between about 5 to 1 and about 15 to 1. In some embodiments, the air to liquid ratio between about 6 to 1 and about 12 to 1. In some embodiments, the air to liquid ratio between about 7 to 1 and about 10 to 1. In some embodiments, the air to liquid ratio between about 8 to 1 and about 12 to 1. In some embodiments, the air to liquid ratio between about 9 to 1 and about 12 to 1. In some embodiments, the air to liquid ratio between about 10 to 1 and about 12 to 1.

An exemplary foam dispenser comprises a housing, a motor, a removable refill unit, a sequentially activated multi-diaphragm pump, a remote mixing chamber and an outlet. The pump receives a foamable liquid from the refill unit, separately pumps the liquid and air to a remote mixing chamber, mixes the foamable liquid with the air to create a foam mixture, forces the foam mixture through foaming media, such as, for example, one or more screens to enrich the foam, and dispenses the foam to a user.

FIG. 1 illustrates an exemplary embodiment of a dispenser 100. In this exemplary embodiment, dispenser 100 is a self-contained dispenser and sits on a counter, a table, or the like. In some embodiments, the dispenser may be a counter-mount dispenser (not shown) having a spout located above the countertop and the pump is located below the counter top. In some embodiments, dispenser 100 is a surface mounted dispenser, such as, for example, a wall mounted dispenser or a stand mounted dispenser. In some embodiments, dispenser 100 is a wall mount dispenser.

Dispenser 100 includes a housing 102. A removable and replaceable refill unit or reservoir 104 is included. The refill unit or reservoir 104 is in fluid communication with a liquid inlet of sequentially activated multi-diaphragm pump 120 through conduit 122. Reservoir 104 is located within hosing 102. In some embodiments, reservoir 104 is located partially within housing 102. In some embodiments, reservoir 104 is located on top of at least a portion of housing 102. In some embodiments, reservoir 104 is located at the bottom of housing 102. In some embodiments, at least a portion of the reservoir 104 is located below the housing 102.

The term reservoir, container or bottle may be used interchangeably. In addition, in some embodiments, a refill unit may also be used interchangeably with container, bottle or reservoir. The term refill unit means a container, reservoir or bottle that may be readily removed from the dispenser and replaced with a new refill unit.

In this exemplary embodiment, reservoir 104 is a sealed reservoir and is a non-collapsing reservoir. Accordingly, a vent valve (not shown) is included in this embodiment. In some embodiments, reservoir 104 is a collapsing reservoir and a vent valve is not required. Preferably when a reservoir 104 is a collapsing reservoir, the reservoir is located within housing 102 so as to not be visible to a consumer unless the dispenser is open.

Located in the base of housing 102 is a motor 110 and a sequentially activated multi-diaphragm pump 120. In some embodiments, sequentially activated multi-diaphragm pump 120 is located above reservoir 104. In some embodiments, sequentially activated multi-diaphragm pump 120 is located beside reservoir 104.

In this exemplary embodiment, liquid inlet 123 is located on the side of sequentially activated multi-diaphragm pump 120 and is substantially perpendicular to liquid outlet 125. Sequentially activated multi-diaphragm pump 120 has an air outlet 126. Air outlet 126 is located along a central axis of the sequentially activated multi-diaphragm pump 120. In this exemplary embodiment, liquid outlet 125 is offset from the central axis.

Air outlet 120 is in fluid communication with remote mixing chamber 144 through air conduit 122. Liquid outlet 125 is in fluid communication with the remote mixing chamber 144 through conduit 130.

Over each operating cycle, multi-diaphragm pump 120 pumps a discrete dose of liquid into liquid conduit 130 and two or more discrete doses of air into air conduit 132. Once conduit 130 is filled with liquid, each operating cycle dispenses a discrete dose of liquid into mixing chamber 144. The volume of the discrete dose of liquid pumped into the mixing chamber is consistent and the flow rate into the mixing chamber are consistent. Similarly, each operating cycle dispenses at least two discrete volumes of air into the mixing chamber. The volumes and flow rate of air into the mixing chamber are consistent. Multiple operating cycles are required for each dose of foam that is dispensed from the outlet.

Liquid and air are mixed together in remote mixing chamber 144. The mixture may be forced through an optional foaming media (not shown, which may be one or more screens) and is dispensed out of outlet 146 as a foam. The foaming media may be in the form of a foaming cartridge.

In this exemplary embodiment, remote mixing chamber 144 and outlet nozzle 146 are located in an overhanging section 105 of housing 102. Outlet nozzle 146 is located in a position that allows a user to place her hand under the outlet nozzle 146 and receive a dose of foam.

Dispenser 100 includes electrical components (not shown) that are required for operating dispenser 100 in a touch-free manner. The electrical components include: one or more power sources, such as, for example, one or more batteries; a microprocessor; a sensor for sensing an object proximate the outlet nozzle; circuitry for activating the sequentially activated multi-diaphragm pump 120; logic for causing the processor to control the functions of the dispenser 100; indicating lights; and any other circuitry required to perform the require functions. Some exemplary touch-free dispenser components that may be used in accordance with the present invention are shown and described in U.S. Pat. No. 8,960,498 titled Touch-Free Dispenser With Single Cell Operation And Battery Banking; U.S. Pat. Pub. No. 2014/00543.22 titled Off-Axis Inverted Foam Dispensers And Refill Units and Pub. No. 2014/0234140 titled Power Systems For Touch Free Dispensers And Refill Units Containing a Power Source, which are incorporated herein by reference in their entirety.

In some embodiments, the dispenser may be a countermount dispenser (not shown) having a spout located above the countertop with the remote mixing chamber located in the spout proximate an outlet of the spout, and the sequentially activated multi-diaphragm pump being located below the countertop. In addition, the reservoir is located below the countertop.

Reservoir 104 may be a permanent reservoir that has soap or sanitizer added to it when the fluid runs out, or it may be removable and replaceable with another reservoir or refill unit. Preferably, if the reservoir 104 is a refill unit, the reservoir 104 includes a body and a neck (not shown) and a drip-free quick connector (not shown) so that the reservoir 104 may be removed from dispenser 100 even if it contains fluid without leaking that fluid. Exemplary drip-free quick connectors are disclosed in U.S. Pat. No. 6,871,679 titled Bag and Dispensing System Comprising Such A Bag, and U.S. Pat. No. 7,647,954 titled Connector Apparatus And Method For Connecting The Same For Controlling Fluid Dispensing, which are incorporated herein by reference in their entirety.

Reservoir 104 contains a supply of a foamable liquid. In various embodiments, the contained foamable liquid could be for example a soap, a sanitizer, a cleanser, a disinfectant, a lotion or the like. The reservoir 104 may be a collapsible container and can be made of thin plastic or a flexible bag-like material. In other embodiments, the container may be a non-collapsing container formed by a rigid or semi-rigid housing, or any other suitable configuration for containing the foamable liquid without leaking. In the case of a non-collapsing container, a vent system may be included. Exemplary venting systems are disclosed in U.S. Patent Applications Publication No. 2015/0266657 titled Closed System for Venting a Dispenser Reservoir; Publication No. 2015/025184 titled Pumps With Container Vents and application Ser. No. 14/811,995, titled Vented Refill Units And Dispensers Having Vented Refill Units, which are incorporated herein by reference.

FIGS. 2-9 illustrate exemplary embodiments of sequentially activated multi-diaphragm pumps and manifolds that may be used in accordance with the present invention. Co-owned U.S. Pat. No. 10,143,339, which is incorporated herein by reference in its entirety, provides detailed workings of sequentially activated pumps for pumping both liquid and air. Many of the components in the pumps disclosed herein are described in detail in U.S. Pat. No. 10,143,339 and thus, may not be described with specificity herein.

Figure 2:
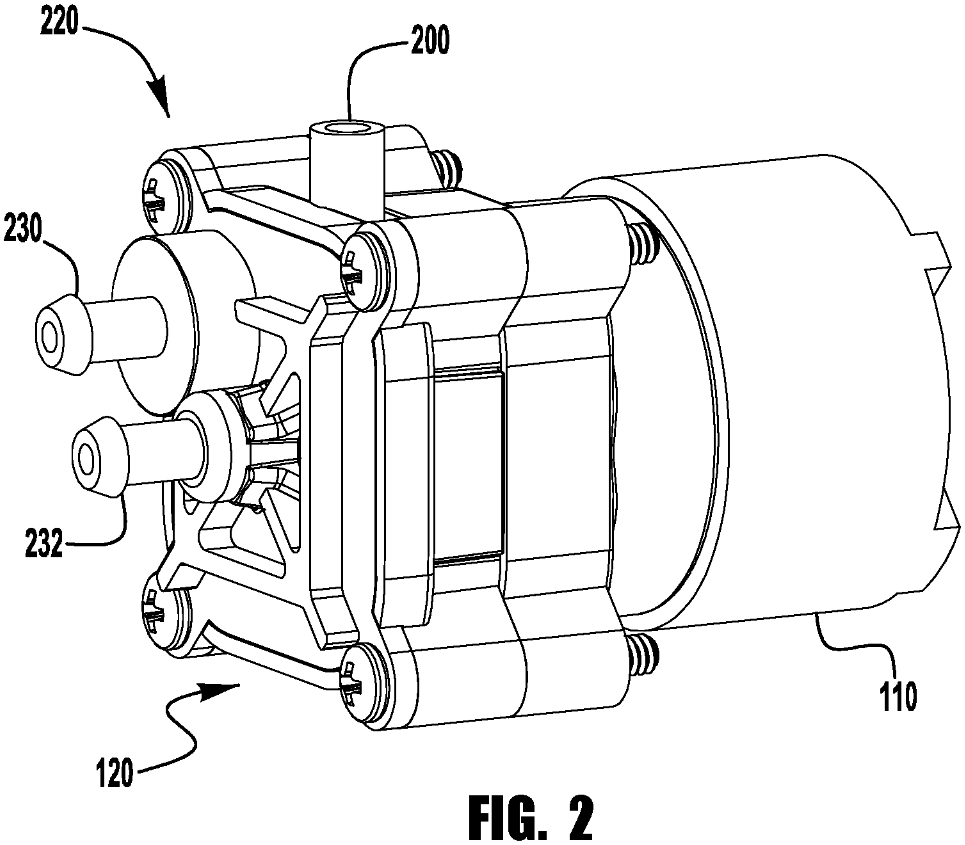
FIG. 2 is an isometric view of an exemplary sequentially operated multi-diaphragm pump and motor for pumping air and liquid to the mixing chamber that is located the pump.
Figure 3:
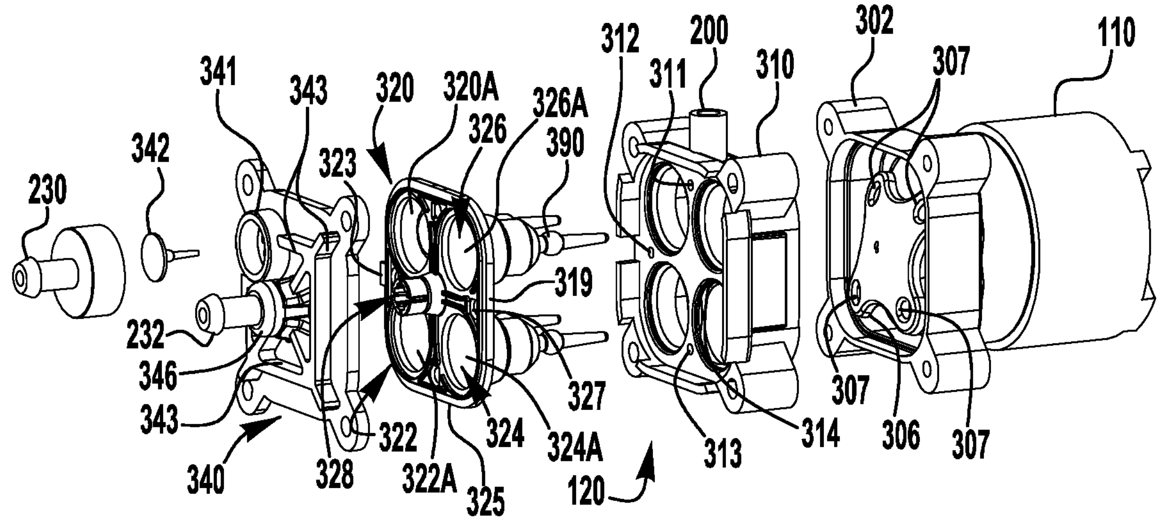
FIG. 3 is an exploded view of the exemplary embodiment of the sequentially activated multi-diaphragm pump and motor of FIG. 2.
Figure 4:
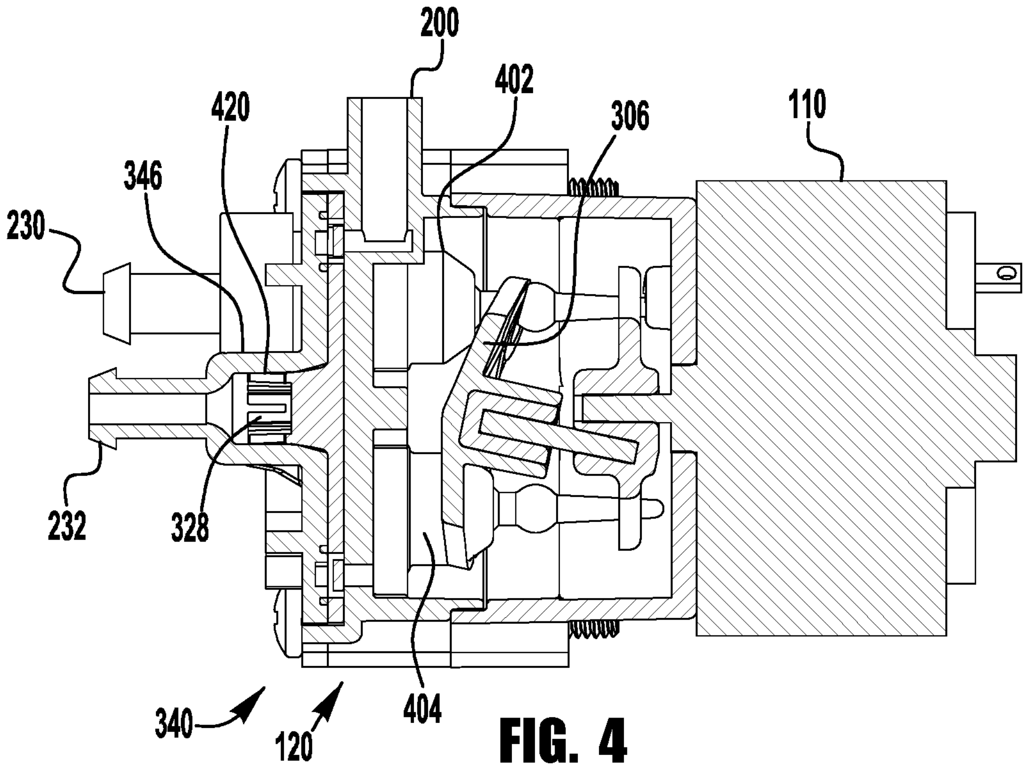
FIG. 4 is a cross-sectional view of the exemplary sequentially operated multi-diaphragm pump and motor of FIG. 2 showing the side port liquid inlet, liquid outlet and air outlet.
Figure 5:
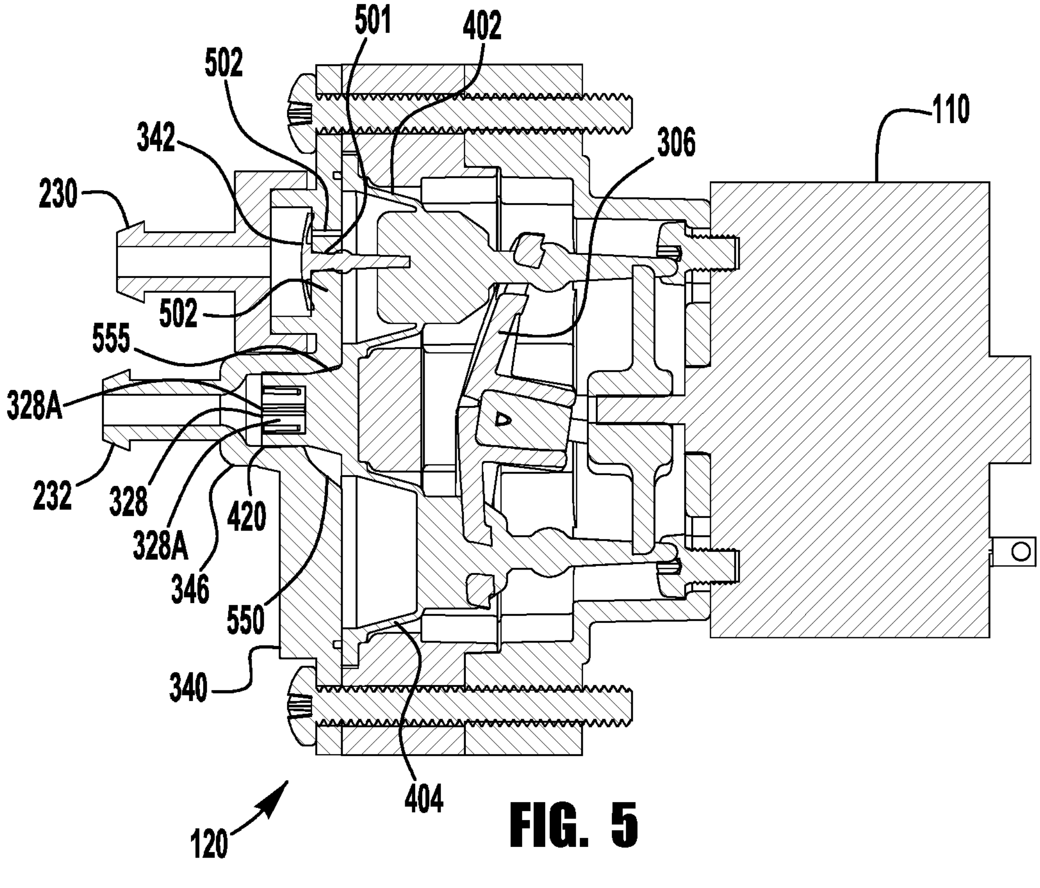
FIG. 5 is another cross-sectional view of the exemplary sequentially operated multi-diaphragm pump and motor of FIG. 2 showing the liquid outlet and the air outlet.

FIG. 2 is a prospective view sequentially activated multi-diaphragm pump 120. FIG. 3 is an exploded view of sequentially activated multi-diaphragm pump 120, and FIGS. 4 and 5 are cross-sectional views of sequentially activated multi-diaphragm pump 120. Sequentially activated multi-diaphragm pump 120 includes a motor 110. Motor 110 is connected to a wobble plate 306 located in a wobble plate housing 302. Wobble plate 306 includes a plurality of connection points 307 that each connect to a liquid pump diaphragm 320 or an air pump diaphragm 322, 324, 326. Movement of the wobble plate 306 causes compression and expansion of the liquid pump diaphragm 320 and air pump diaphragms 322, 324, and 326 in a sequential fashion.

A diaphragm housing 3120 is connected to wobble plate housing 302. Diaphragm housing 310 incudes a liquid inlet 200. Liquid inlet 200 is in fluid communication with liquid inlet passage 311. Diaphragm housing 310 also includes air inlet passages 3122, 313, 314 in fluid communication with ambient air.

Diaphragm housing 310 receives multi-chamber diaphragm 319. Multi-chamber diaphragm 319 includes a liquid pump chamber 320A formed in part by liquid pump diaphragm 320, and three air pump chambers 322A, 324A, and 326A formed in part by air pump diaphragm 322, air pump diaphragm 324 and air pump diaphragm 326. Multi-chamber diaphragm 319 includes a liquid inlet valve 321. Liquid inlet valve 321 is a one-way valve that allows fluid to flow from liquid inlet 200 to the interior of liquid pump chamber 320A. Multi-chamber diaphragm 319 includes three air inlet valves 323, 325, and 327 respectfully. Air inlet valve 323 is a one-way valve that allows ambient air to flow to the interior of air pump chamber 322. Air inlet valve 325 is a one-way valve that allows ambient air to flow to the interior of air pump chamber 324. Air inlet valve 327 is a one-way valve that allows ambient air to flow to the interior of air pump chamber 326. Multi-chamber diaphragm 319 also includes a one-way air outlet valve 328 that allows air to flow out of air pump chambers 322, 324, and 326. In this exemplary embodiment, liquid inlet valve, 321, air inlet valves 323, 325, and 327 and air outlet valve 328 are all integrally molded with multi-chamber diaphragm 319. In some embodiments, one or more of these valves are separate from multi-chamber diaphragm 319.

Secured to diaphragm housing 310 is manifold 340. In this exemplary embodiment, manifold 340 includes a central hub 346 that has a cylindrical shape. Air outlet valve 328 is located withing the central hub 346. The interior walls 420 of the central hub 346 form a seat or sealing member for air outlet valve 328. Air outlet valve 328 includes a plurality of fingers 328A that deflect inward under pressure from air being pumped from the air pump chambers 322A, 324A, and 326A to allow air to flow past the one-way air inlet valve 328. The fingers 328A seal against the interior wall 420 to prevent air from flowing from the outlet back to the air pump chambers 322A, 324A, and 326A. Air outlet port 323 is in fluid communication with hub 346 and connects to air outlet conduit 132.

Manifold 340 includes a liquid outlet hub 341. Liquid outlet hub 341 is cylindrical in this exemplary embodiment but may have other geometric shapes. Liquid outlet hub 341 is configured to connect to liquid outlet port 230. In this exemplary embodiment, liquid outlet port 230 has a cylindrical wall and the interior of the cylindrical wall is configured to mate with the exterior or liquid outlet hub 341 to connect the liquid outlet port 230 to manifold 340. The connection may be, for example, a friction fit, a welded connection, an adhesively bonded connection, a threaded connection or the like.

Located within liquid outlet hub 341 is a valve retention aperture 501 that receives and retains liquid outlet valve 342. In this exemplary embodiment, one or more apertures 502 are also located within liquid outlet hub 341. Apertures 502 are covered by liquid outlet valve 342, which in this exemplary embodiment is a normally closed valve. As liquid pump chamber 320A compresses, liquid flows through apertures 502 past one way-liquid outlet valve 341 and into liquid conduit 130.

Manifold 340 includes a liquid pump chamber sealing member 555. Liquid pump chamber sealing member 555 isolates liquid pump chamber 320A from the air outlet valve 328 and prevents liquid from flowing into the air outlet port 323. Liquid pump chamber sealing member 555 prevents Liquid pump chamber sealing member 555 may be contrasted to the chamfer 550 portion of the manifold 340 located proximate the air outlet valve 328, which allows air to flow and contact the flap portion of the air outlet valve 328 to deflect to allow air to flow past. In some embodiments, liquid pump chamber sealing member is a gasket. In some embodiments, liquid pump chamber sealing member is an annular projection that seals against the multi-chamber diaphragm.

In addition, manifold 340 includes a plurality of optional ribs 343. In some embodiments, ribs 343 prevent flexing or bowing of manifold 340. Flexing or bowing of manifold 340 may result in blow by of liquid and/or air or cross-contamination of liquid and air in the liquid conduit 130 and or air conduit 132.

In this exemplary embodiment, liquid inlet port 200 is located substantially perpendicular to liquid outlet port 230. Having liquid inlet port 200 arranged substantially perpendicular to liquid outlet port 230 has several advantages over other arrangements. In some embodiments, the tortuous path through the substantially perpendicular liquid inlet port 200, through the passage 311 and to the liquid pump chamber 320A aids in holding back head pressure from reservoir 104. In some embodiments, this arrangement facilitates a desired flow reducer that slows flow of liquid into the liquid pump chamber 320A.

Figure 6:
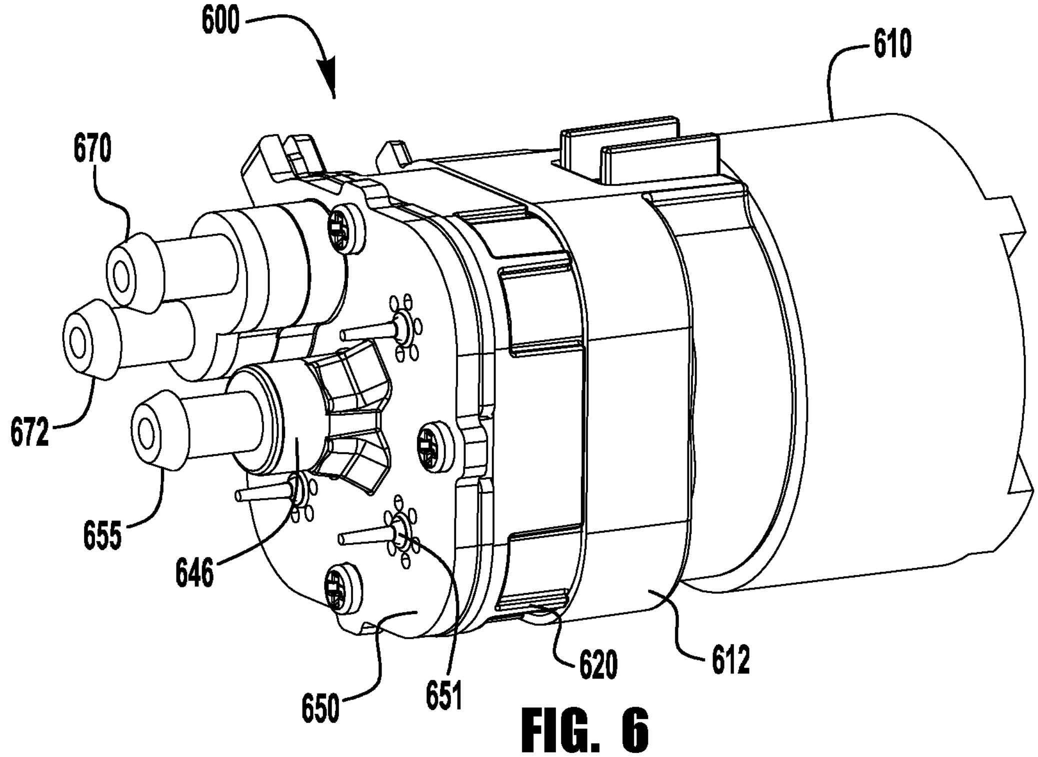
FIG. 6 is an isometric view of another exemplary sequentially operated multi-diaphragm pump and motor having a liquid inlet port that is parallel to the liquid outlet port and the air outlet port.
Figure 7:
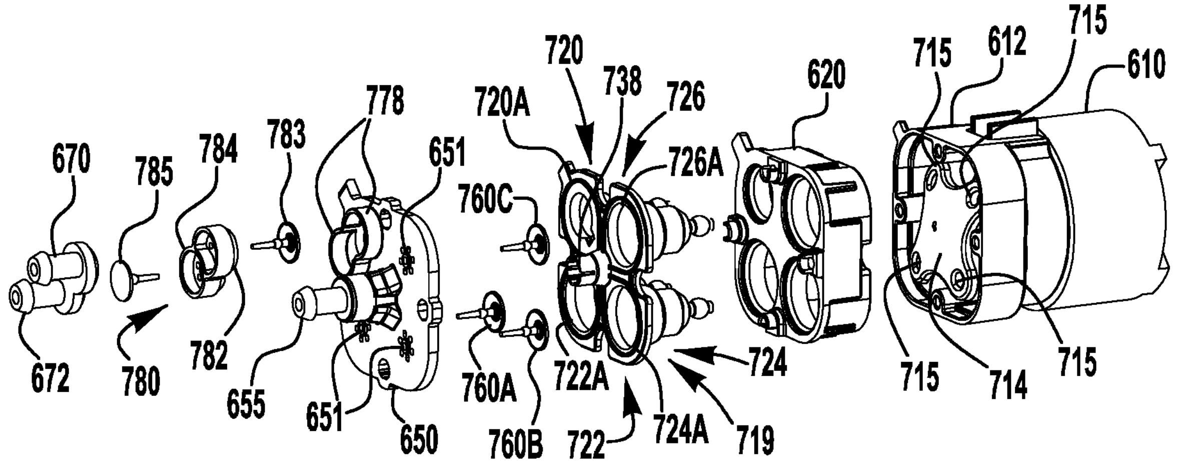
FIG. 7 is an exploded view of the exemplary embodiment of the sequentially activated multi-diaphragm foam-at-a-distance pump and motor of FIG. 6.
Figure 8:
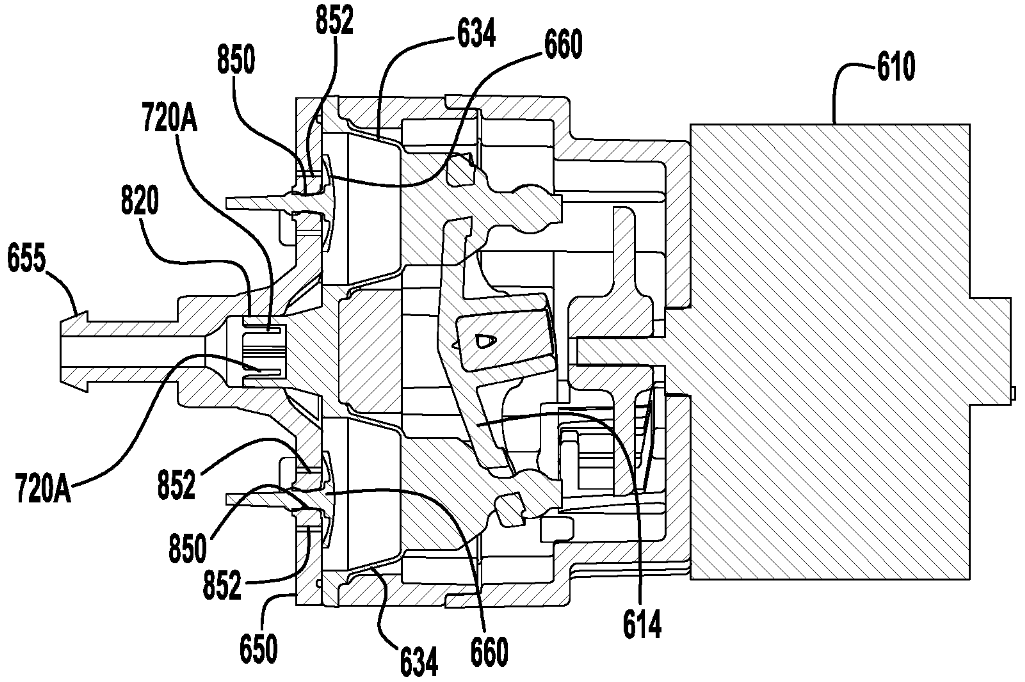
FIG. 8 is a cross-section of the exemplary sequentially operated multi-diaphragm pump and motor of FIG. 6 showing the air outlet port and two of the air pumping chambers.
Figure 9:
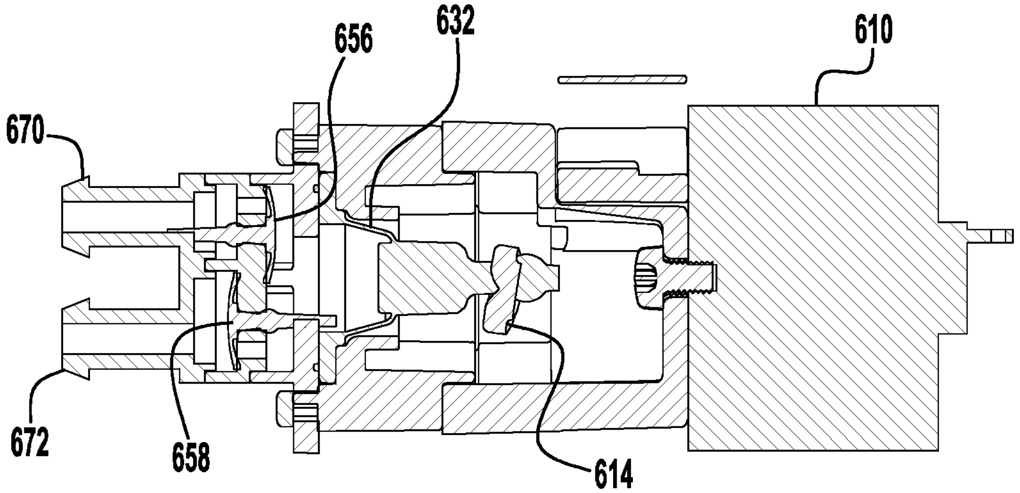
FIG. 9 is another cross-section of the exemplary sequentially operated multi-diaphragm pump and motor of FIG. 6 showing the parallel liquid inlet port and liquid outlet port.

FIG. 6 is a prospective view of sequentially activated multi-diaphragm pump 600. FIG. 7 is an exploded view of the sequentially activated multi-diaphragm pump 600. FIG. 8 is a cross-sectional view of the sequentially activated multi-diaphragm pump 600 showing two of the air pump chambers and the air outlet port. FIG. 9 is a cross-sectional view of the sequentially activated multi-diaphragm pump 600 showing the liquid pump chamber, liquid inlet port and liquid outlet port. Sequentially activated multi-diaphragm pump 600 includes a motor 610. Motor 610 is connected to a wobble plate 714 located in a wobble plate housing 612. Wobble plate 714 includes a plurality of connection points 715 that each connect to a liquid pump diaphragm 720 or an air pump diaphragm 722, 724, 726. Movement of the wobble plate 714 causes compression and expansion of the liquid pump diaphragm 720 and air pump diaphragms 722, 724, and 726 in a sequential fashion.

A diaphragm housing 620 is connected to wobble plate housing 612. Diaphragm housing 620 receives multi-chamber diaphragm 719. Multi-chamber diaphragm 719 includes a liquid pump chamber 720A formed in part by liquid pump diaphragm 720, and three air pump chambers 722A, 724A, and 726A formed in part by air pump diaphragm 722, air pump diaphragm 724 and air pump diaphragm 726 respectively.

Secured to diaphragm housing 620 is manifold 650. In this exemplary embodiment, manifold 650 includes a central hub 646 that has a cylindrical shape. Air outlet valve 738 is located withing the central hub 646. The interior wall 820 of the central hub 646 forms a seat or sealing member for air outlet valve 738. Air outlet valve 738 includes a plurality of fingers 738A that deflect inward under pressure from air being pumped from the air pump chambers 722A, 724A, and 726A to allow air to flow past the one-way air inlet valve 738. The fingers 738A seal against the interior wall 820 to prevent air from flowing from the outlet back to the air pump chambers 722A, 724A, and 726A. Air outlet port 655 is in fluid communication with hub 646 and connects to an air outlet conduit (not shown).

Manifold 650 includes an air inlet valve retention aperture 850 for each air inlet valve 760A, 760B and 760C. Air inlet valves 760A, 760B and 760C are one-way inlet valves and are normally closed valves. Manifold 650 also includes one or more air inlet apertures 852 located proximate valve retention apertures 850 that allow air to flow into the air pump chambers 722A, 724A and 726A. As air pump chambers 760A, 760B and 760C expand, air flows through air flow apertures 850 and deflect air inlet valves 760A, 760B and 760C allowing air to flow into the respective air pump chambers 722A, 724A and 726A.

Manifold 650 includes liquid valve insert retaining member 778. In this exemplary embodiment, liquid valve insert retaining member 778 comprises is an upward projecting member having two semi-circular portions. Liquid valve insert 780 is configured to connect to liquid valve insert retaining member 778. The connection may be any type of connection, permanent or semi-permanent, such as, for example, a friction fit, a welded connection, an adhesive connection, a snap-fit connection, or the like. Liquid valve insert 780 includes a liquid inlet valve retaining aperture (not shown) for retaining liquid inlet valve 783. Liquid valve insert 780 also includes one or more liquid inlet apertures (not shown) that work with one-way liquid inlet valve 783 to allow liquid to flow into the liquid pump chamber 720A and prevent liquid from flowing out of liquid pump chamber 720A.

Liquid valve insert 780 includes a liquid outlet valve retaining aperture (not shown) for retaining liquid outlet valve 785. Liquid valve insert 780 also includes one or more liquid outlet apertures (not shown) that work with one-way liquid outlet valve 785 to allow liquid to flow out of the liquid pump chamber 720A and prevent liquid from flowing into of liquid pump chamber 720A. Liquid inlet port 670 and liquid outlet port 672 are configured to connect to liquid valve insert 780 in any manner, such as those described above. A liquid inlet conduit (not shown) connects to liquid inlet port and a liquid outlet conduit (not shown) connects to liquid outlet port 672.

In this exemplary embodiment, liquid inlet port 670 is located substantially parallel to liquid outlet port 672. Having liquid inlet port 670 arranged substantially parallel to liquid outlet port 672 has several advantages over other arrangements. In some embodiments, the configuration reduces the forces required to pump the fluid. Reducing the force required to pump the fluid increases the efficiency of the sequentially activated multi-diaphragm pump 620. In embodiments, such as, for example, those operated by batteries, the increased efficiency may lead to increased battery life.

Figure 10:
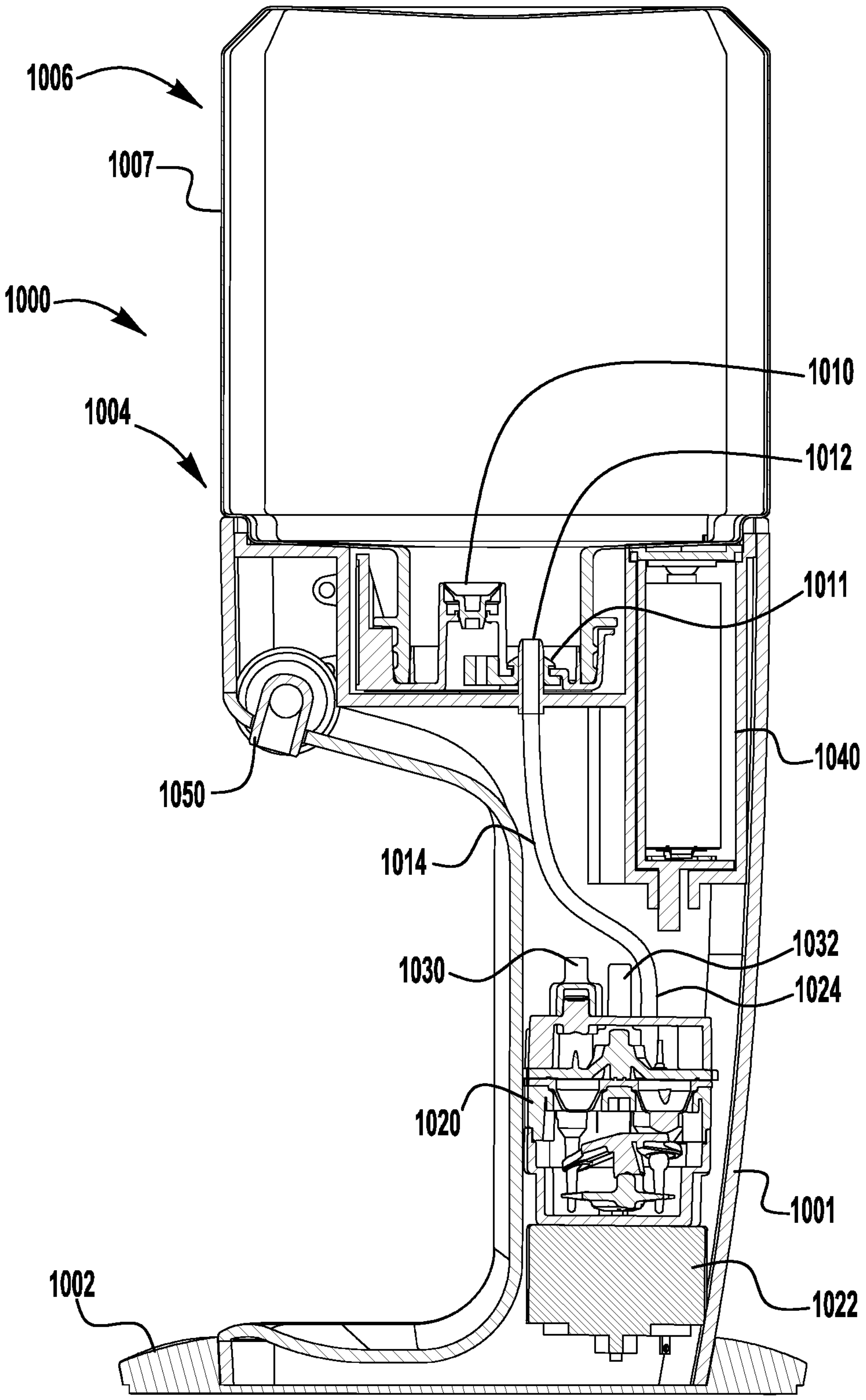
FIG. 10 is a cross-sectional view of an exemplary table top dispenser having a sequentially activated multi-diaphragm pump and motor.

FIG. 10 is a cross-sectional view of an exemplary table top dispenser 1000. Dispenser 1000 has a housing 1001 and a base 1002. Base 101 is configured to rest or sit on a countertop. Dispenser 1000 has a sequentially activated multi-diaphragm pump 1020 and motor 1022. The sequentially activated multi-diaphragm pump 1020 is substantially the same as the ones described above and incorporated within this document. Dispenser 1000 has a refill receptacle 1004 that receives a refill unit 1006.

Refill unit 1006 includes a non-collapsing bottle or container 1007. Located in the lower portion of refill unit 1006 is a vent valve 1010 for allowing air to flow into non-collapsing bottle or container 1007. Refill unit 1006 also includes a resealable sealing member 1011.

Exemplary refill units and descriptions thereof may be found in U.S. Pat. Pub. No. 2020/0197966 titled Refillable Dispenser Having Reservoirs and Refill Containers Configured for Fluid and Air Transfer Therebetween, which is incorporated by reference herein in its entirety, and in U.S. Pat. Pub. No. 2019/0133384 titled Touch-Free Dispensers, which is also incorporated by reference herein in its entirety.

When refill unit 1006 is inserted into dispenser 1000, liquid inlet post 1012 penetrates through resealable sealing member 1001 to place the interior of liquid inlet post 1012 in fluid communications with the interior of container 1007. A liquid inlet conduit 1014 extends from the liquid inlet post 1012 to a pump liquid inlet 1024 placing the multi-diaphragm foam in fluid communication with the interior of container 1007. In this exemplary embodiment, multi-diaphragm pump 1020 is located below refill unit 1006.

Figure 11:
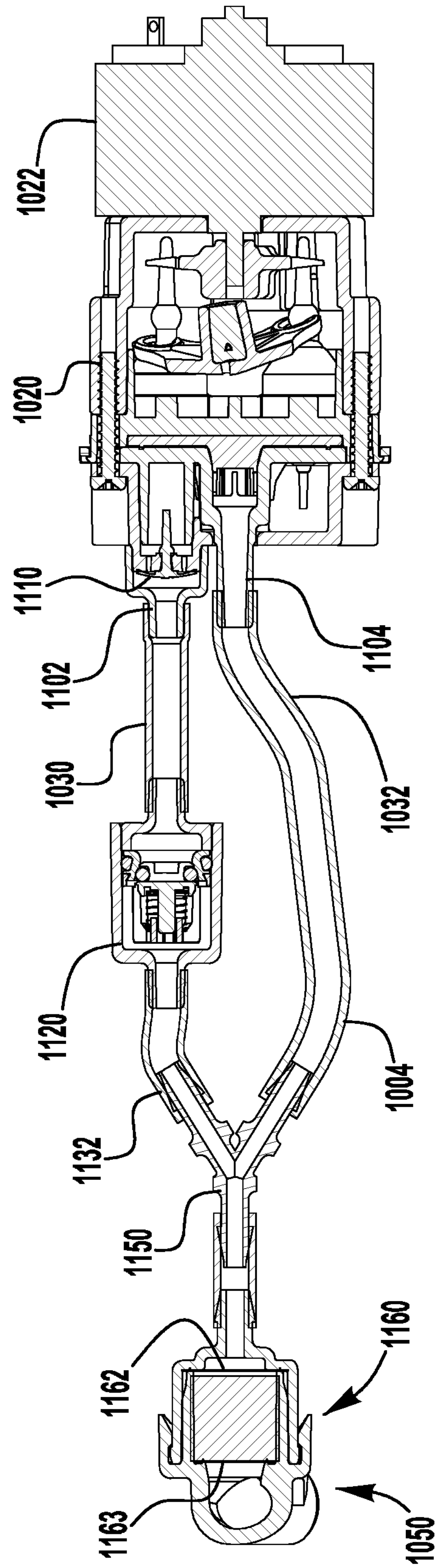
FIGS. 11 and 12 are a cross-sectional views of the fluid delivery system of the table top dispenser of FIG. 10.
Figure 12:
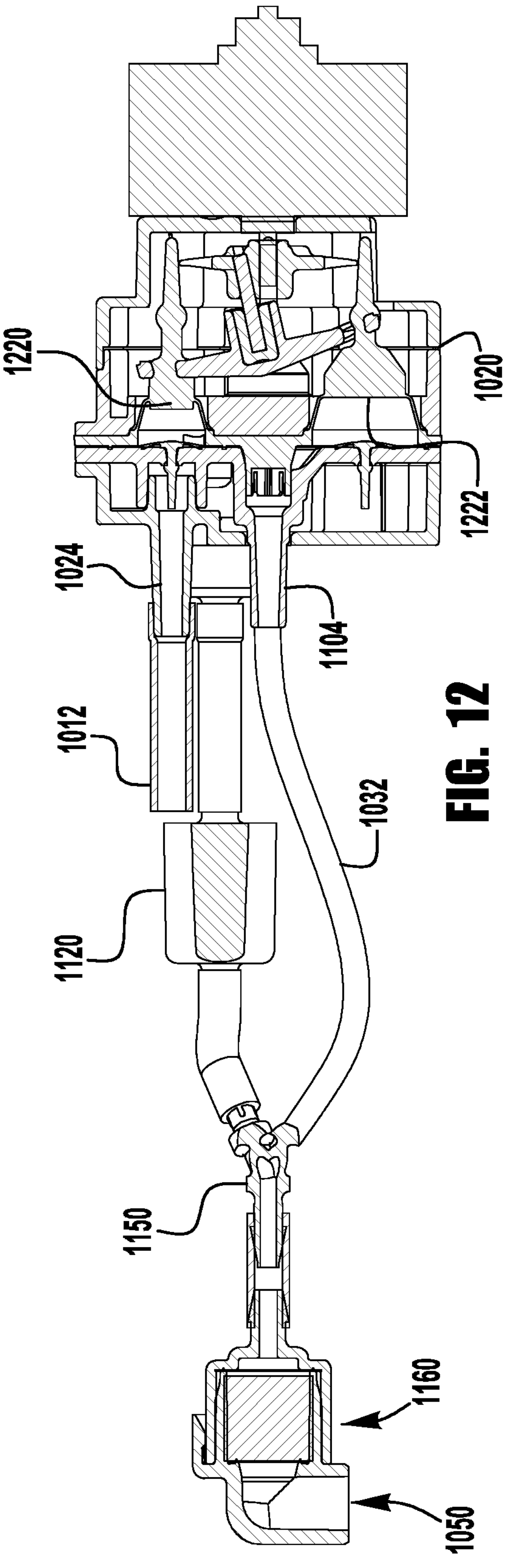

As can be better seen in FIGS. 11 and 12, multi-diaphragm pump 1020 has a first liquid outlet valve 1110 and a liquid outlet 1102. In this exemplary embodiment, multi-diaphragm pump 1020 has a single liquid pumping diaphragm 1220 and a plurality of air pumping diaphragms 1222. In some embodiments, more than one diaphragm pumps liquid. In this exemplary embodiment, the air pump diaphragms 1222 are larger in volume than the liquid pump diaphragm 1220. A liquid outlet conduit 1030 extends from liquid outlet 1102 to a one-way valve 1120. In some exemplary embodiments, one-way valve 1120 has a cracking pressure that is higher than the head pressure of the liquid in the refill unit 106. Liquid outlet conduit 1132 extends from one-way outlet valve 1120 to mixing Y 1150.

Multi-diaphragm pump 1120, which is driven by motor 1022 has an air outlet 1104. An air outlet conduit 1032 extends from air outlet 1104 to mixing Y 1150. Air and liquid mix together in mixing Y 1150. The air and liquid mixture flow into mixing cartridge 1160. Mixing cartridge 1160 contains one or more mix media to enhance the foam quality of the liquid/air mixture. In this exemplary embodiment, mixing cartridge 1160 contains a first screen 1162 and a second screen 1163. Upon exiting the mixing cartridge 1160, foam is dispensed out of the foam outlet 1050.

Figure 13:
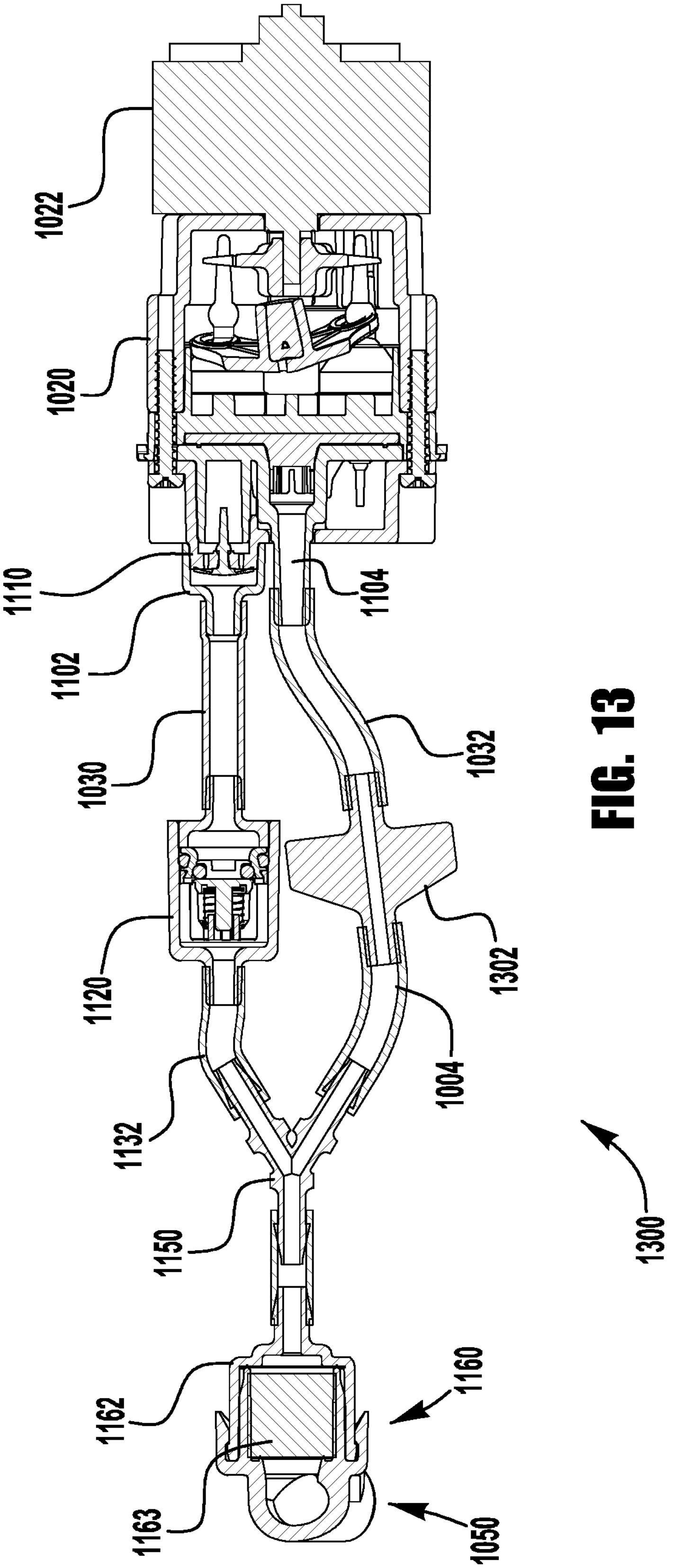
FIG. 13 is a cross-sectional view of a fluid delivery system having a check valve in the air line.

FIG. 13 is a cross-sectional view of a fluid delivery system 1300. Fluid deliver system 1300 is similar to those shown above in FIGS. 11 and 12. In this exemplary embodiment, a one-way check valve 1302 is located in air outlet conduit 1032. The one-way check valve 1302 may be located anywhere along air outlet conduit 1032. Preferably one-way check valve 1302 is located close to Y 1150. One-way check valve 1302 may be used to prevent liquid from flowing down air outlet conduit 1032 back toward the pump 1120, which may occur when the dispensing outlet is located above the pump 1120 and residual foam in the system breaks down and drains back toward the pump 1120.

Although not illustrated herein, the dispensers contain additional electrical components that they need to operate. For example, the dispensers include an object sensor, such as, for example, an infrared emitter/detector to detect a user's hands. The dispensers include a processor, memory, one or more power sources, e.g. batteries, capacitors, and the like. The dispensers may include additional circuitry as known in the art.

In addition, while the above inventive concepts have been discussed with respect to counter mount dispenses and wall mount dispensers, the systems may also be used in "under" counter mount dispensers that have a dispensing spout located above the counter.

While the present invention has been illustrated by the description of embodiments thereof and while the embodiments have been described in considerable detail, it is not the intention of the applicants to restrict or in any way limit the scope of the appended claims to such detail. Additional advantages and modifications will readily appear to those skilled in the art. Moreover, elements described with one embodiment may be readily adapted for use with other embodiments. Therefore, the invention, in its broader aspects, is not limited to the specific details, the representative apparatus and illustrative examples shown and described. Accordingly, departures may be made from such details without departing from the spirit or scope of the applicants' general inventive concept.

The invention claimed is:

1. A foam dispenser comprising:

a housing;

a reservoir for holding a foamable liquid;

a sequentially operated multi-diaphragm pump located below the reservoir;

the sequentially operated multi-diaphragm pump having a liquid pump chamber;

two or more air pump chambers; and a single piece manifold;

the manifold having;

a first one-way liquid outlet valve secured thereto;

a liquid outlet port;

an air outlet port;

a one-way air outlet valve;

a liquid pump chamber sealing portion configured to prevent the liquid from flowing through the one-way air outlet valve;

an elongated liquid dispensing conduit in fluid communication with the liquid outlet port;

an elongated air dispensing conduit in fluid communication with the air outlet port;

a mixing chamber located remotely from the sequentially operated multi-diaphragm pump;

the mixing chamber having a mixing chamber liquid inlet, a mixing chamber air inlet, and a foam outlet;

wherein the elongated liquid dispensing conduit is in fluid communication with the mixing chamber liquid inlet;

wherein the elongated air dispensing conduit is in fluid communication with the mixing chamber air inlet;

wherein during operation, the mixing chamber receives fluid as a series of single injections of the liquid followed by two or more single injections of air; and an outlet nozzle located downstream of the foam outlet of the mixing chamber;

wherein the outlet nozzle is located above at least a portion of the reservoir.

2. The foam dispenser of claim 1 further comprising a second one-way liquid outlet valve in the in the elongated liquid conduit upstream of the mixing chamber.

3. The foam dispenser of claim 1 further comprising a one-way check valve located in the elongated air dispensing conduit.

4. The foam dispenser of claim 1 wherein the manifold further comprises a liquid inlet port.

5. The foam dispenser of claim 4 wherein the liquid inlet port is parallel to the liquid outlet port.

6. The foam dispenser of claim 5 wherein the liquid inlet port is located outside of the air outlet port and offset from the air outlet port.

7. The foam dispenser of claim 1 wherein the air outlet port is located along a central axis and the liquid outlet port is located outside of the air outlet port and off-set from the central axis.

8. The foam dispenser of claim 1 further comprising a liquid inlet, wherein the liquid inlet is perpendicular to the liquid outlet port.

9. A foam dispenser comprising:

a housing;

a reservoir for holding a foamable liquid;

a sequentially operated multi-diaphragm pump;

the sequentially operated multi-diaphragm pump having a liquid pump chamber;

two or more air pump chambers; and a single piece manifold;

the manifold having;

a liquid outlet port;

a liquid outlet valve;

a liquid inlet port;

a liquid inlet valve;

an air outlet port; and one or more air outlet valves;

an elongated liquid dispensing conduit in fluid communication with the liquid outlet port;

an elongated air dispensing conduit in fluid communication with the air outlet port;

a mixing chamber located remotely from the sequentially operated multi-diaphragm pump;

the mixing chamber having a mixing chamber liquid inlet, a mixing chamber air inlet, and a foam outlet;

wherein the elongated liquid dispensing conduit is in fluid communication with the mixing chamber liquid inlet;

wherein the elongated air dispensing conduit is in fluid communication with the mixing chamber air inlet; and an outlet nozzle located downstream of the foam outlet of the mixing chamber;

wherein the outlet nozzle is located above at least a portion of the reservoir.

10. The foam dispenser of claim 9 wherein the sequentially operated multi-diaphragm pump is located below the reservoir.

11. The foam dispenser of claim 9 wherein the outlet nozzle is located above the sequentially operated multi-diaphragm pump.

12. The foam dispenser of claim 9 further comprising a one-way liquid outlet valve in the elongated liquid dispensing conduit proximate the mixing chamber.

13. The foam dispenser of claim 9 further comprising a one-way check valve in the elongated air dispensing conduit proximate the mixing chamber.

14. A foam dispenser comprising:

a housing;

a reservoir for holding a foamable liquid;

a sequentially operated multi-diaphragm pump;

the sequentially operated multi-diaphragm pump having a liquid pump chamber;

two or more air pump chambers; and a single piece manifold;

the manifold having;

a liquid outlet port;

a liquid outlet valve;

an air outlet port; and one or more air inlet valves;

a liquid inlet port;

a liquid inlet port valve;

wherein the liquid inlet port and the liquid outlet port are parallel to one another;

an elongated liquid dispensing conduit in fluid communication with the liquid outlet port;

an elongated air dispensing conduit in fluid communication with the air outlet port;

a mixing chamber located remotely from the sequentially operated multi-diaphragm pump;

the mixing chamber having a mixing chamber liquid inlet, a mixing chamber air inlet, and a foam outlet;

wherein the elongated liquid dispensing conduit is in fluid communication with the mixing chamber liquid inlet;

wherein the elongated air dispensing conduit is in fluid communication with the mixing chamber air inlet; and an outlet nozzle located downstream of the foam outlet of the mixing chamber;

wherein the outlet nozzle is located above at least a portion of the reservoir; and wherein the mixing chamber receives a series of at least 10 pulses of fluid, wherein each series is in the form of a sequence of a liquid pulse followed by two or more air pulses.

15. The foam dispenser of claim 14 wherein the manifold further comprises a central hub that forms at least a portion of a seat for an air outlet valve.

16. The foam dispenser of claim 14 wherein the sequentially operated multi-diaphragm pump is located below the reservoir.

17. The foam dispenser of claim 14 wherein the outlet nozzle is located above the sequentially operated multi-diaphragm pump.

18. The foam dispenser of claim 14 wherein the manifold comprises a plurality of ribs along an outside surface.

19. The foam dispenser of claim 14 further comprising a one-way liquid outlet valve in the elongated liquid dispensing conduit proximate the mixing chamber.

20. The foam dispenser of claim 14 further comprising a one-way check valve in the elongated air dispensing conduit proximate the mixing chamber.

* * * * *